Patented Feb. 22, 1944

2,342,357

UNITED STATES PATENT OFFICE 2,342,357

FUSION JOINING OF METALS

Mike A. Miller, New Kensington, Pa., assignor to Aluminum Company of America, Pittsburgh, Pa., a corporation of Pennsylvania No Drawing. Application December 26, 1941, Serial No. 424,401

3 Claims. (Cl. 113—112)

This invention relates to the art of fusion joining a plurality of metallic members, and it is more particularly concerned with providing a method for controlling the spread of materials employed to form the joint.

By the term "fusion joining" I mean to include those joining operations where a metallic bond is formed between the members by the fusion and solidification of metal. It is customary to refer to the metal added to the joint for the purpose of forming a bond between the members as filler metal.

In the fusion joining process, saline fluxes are generally employed to clean the metal surface where the joint is made and to protect the molten metal against oxidation. Readily fusible mixtures of alkali metal halides with or without additions of alkaline earth halides are generally used as fluxes in the fusion joining of light metal members. While the fluxes serve a useful purpose, there are some disadvantages attendant upon their employment. For example, the molten flux has the disadvantage that it frequently spreads well beyond the areas to be included in the joint. Since an excess of flux is normally applied, relatively large areas may thus become covered with flux. Many fluxes clean the surfaces they cover so well that there is a lasting noticeable difference between these surfaces and those over which the flux has not spread, thus detracting from the appearance of the article. Furthermore, some fluxes contain heavy metal salts which decompose leaving a metallic deposit that may be rough and unsightly. It is also important to keep the flux from running into places or over surfaces which are not readily accessible and from which the flux cannot be removed after the joining operation, since many fluxes, particularly those containing alkaline chloride salts, corrode light metal and other surfaces when left in contact therewith for any considerable period of time in the presence of moisture.

Because of the fact that the fluid flux spreads to a considerable degree, portions of the fused filler metal are often enabled to spread so far as to be of no utility in the formation of the joint. Such spreading of the molten filler metal is not only wasteful but is undesirable for other reasons as well. For example, when brazing aluminum sections which are to receive an artificially produced oxide coating, as little of the filler metal as possible should extend beyond the joint since the filler metal is very apt to assume a different shade of color under the oxide coating treatment. Again, where a joint having a precise angular configuration is desired, the fillet of filler metal should be as compact as possible.

It is an object of my invention to provide an improved method of limiting the flow of molten flux and filler metal during the joining of metal parts by fusion processes. In particular, it is an object of my invention to provide a method of confining the spread of the molten flux and filler metal to any desired area. A further object is to provide a method of so confining the spread of the molten flux and filler metal that after the joining operation has been completed, the confining material can be readily removed.

I have discovered that the spread of the flux and filler metal, which become fluid at the temperature of the joining operation, can be limited by applying to the surfaces of the metal members being joined, adjacent to the areas where the flux is applied, certain saline materials herein referred to as "stop-off agents" which will interact with the fluid flux during the joining operation. The saline stop-off agent should be a material which does not become fluid at the temperature of the joining operation, but which will interact with the fluid flux to cause the solidification of at least a part thereof when the flux comes into contact with the stop-off agent. The character of this solid phase resulting from the interaction between the stop-off agent and the fluid flux must be such that substantially no wetting of the metal surfaces by the flux occurs beyond the areas where the fluid flux meets the stop-off agent.

Interaction of the stop-off agent with the fluid flux may cause the solidification of the latter by the solution in the flux of at least a portion of the stop-off agent, where the effect of this solution is to raise the melting point of the flux sufficiently to cause the solidification of the portions thereof acting as a solvent for the stop-off agent. When such a stop-off agent is placed on the surface adjacent to the areas where the flux is applied, and heat is applied to fuse the flux and filler metal, the fluid flux creeps up to the stop-off agent and dissolves enough of it to raise the melting point of the portion of the flux coming into contact therewith to cause said portion to solidify. The solidified material thus formed prevents the remaining flux from spreading any further. The molten filler metal, also, cannot spread beyond this point since the wetting action of the flux ceases there.

While the stop-off agent will perhaps perform its function in the great majority of cases by raising the melting point of the flux in the manner I have described in the preceding paragraph, the interaction with the flux may alternatively be of a different type. That is, the stop-off agent may be of such a character that interaction with the fluid flux causes a precipitation of a portion of the flux with which the stop-off agent comes in contact. For the purposes of preventing the spread of fluid flux and filler metal, such precipitation can be as effective as raising the melting point of the flux sufficiently to cause the solidification thereof, provided the precipitate so formed acts to prevent any wetting of the metal surfaces by the flux beyond the areas where the fluid flux meets the stop-off agent.

Illustrative of the invention herein described, it has been discovered that the spread of the various alkali metal chloride-containing fluxes, such as those commonly employed in joining light metal members, is most effectively confined by employing as a stop-off agent one or more salts of the group composed of the fluorides of the metals sodium, potassium, lithium, barium, strontium, calcium, and magnesium, or the double fluorides of one of these metals and aluminum or silicon. Representative of such double fluorides are cryolite ($AlF_3 \cdot 3NaF$), chiolite ($5NaF \cdot 3AlF_3$), calcium fluosilicate ($CaSiF_6$), and potassium fluosilicate ($K_2SiF_6$). These fluorides and double fluorides are herein referred to as "alkaline fluorides" by virtue of the similarity of their properties and function as stop-off agents. These materials act to confine the spread of the fused alkali metal chloride-containing fluxes by dissolving in and consequently raising the melting point of the fluxes sufficiently to cause a portion to solidify. While any of these alkaline fluorides may be used with success as a stop-off agent against such alkali metal chloride-containing fluxes, I prefer to use sodium fluoride whenever possible since this material readily washes off the surfaces to which it is applied and has the further important advantage of being easily obtainable in relatively pure form at a comparatively low cost.

As a further illustration of my invention, I have discovered that a silicate of the alkaline metals sodium, potassium, lithium, barium, strontium, calcium, and magnesium, may be used as a stop-off agent in connection with the borax type of flux used in joining iron and copper with bronze filler metal. These silicates, which will hereinafter be referred to as "alkaline silicates," act in the same manner toward the borax type of flux as the aforementioned fluorides behave toward alkali metal chloride-containing fluxes.

For some applications, it may be desirable to employ as a stop-off agent a mixture of two or more substances which might otherwise be employed singly for the same purpose. However, when employing mixtures of such substances, care should be taken to make certain that the mixture will not become liquid at the temperature of the joining operation.

In the practice of my invention it is frequently desirable to incorporate other substances with the stop-off agent either for the purpose of supplying a vehicle to facilitate application of the material to the metal surfaces, or for the purpose of improving or modifying certain properties of the stop-off agent. For example, when employing an alkaline fluoride as a stop-off agent on a light metal surface, and particularly an aluminum surface, it is desirable to add about 2 to 20 per cent sodium silicate to the fluoride before its application to the surface, although I prefer to use about 7 to 10 per cent of this silicate component. In this case the added silicate has no function as a stop-off agent, that is, it does not interact with the flux, but only acts to inhibit the slight tendency of the alkaline fluoride to etch some light metal surfaces in the presence of certain fluxes during the joining operation. A readily volatile substance such as water or alcohol is frequently mixed with the stop-off agent because the material may be more easily applied to the metal surface when in liquid or semi-liquid form.

The use of a stop-off agent finds particular application in those joining operations such as furnace and electric brazing. In these operations, application of the stop-off agent is generally the last operation on the assembled article before it is heated, and hence the stop-off agent is not likely to be disturbed by any handling of the article. Furthermore, were it not for the stop-off agent, the spread of the fluid flux and filler metal in such operations would be much greater than in conventional welding and soldering operations.

As an example of the manner in which my invention finds application, I will describe a suitable method to limit the spread of an alkali metal chloride-containing flux upon an aluminum surface in a brazing operation. A stop-off agent of sodium fluoride, together with about 7 to 10 per cent by weight of sodium silicate, is mixed with enough water or alcohol to form a thin slurry. The slurry is then painted as a narrow strip or barrier upon the surface of the article adjacent to the areas where the flux is applied. The brazing flux is applied to the part in the usual manner where the joint is to be made. Either before or after the application of the flux and/or the stop-off agent, the parts are assembled in a jig in the proper structure-forming relationship with suitable filler or brazing metal being placed at the junction of the parts. The whole assembly is then placed in a furnace or other suitable heating unit where the flux and the brazing metal are fused. During the brazing process the molten flux creeps up to the stop-off agent, and the portion of the flux coming into contact therewith thereupon solidifies. Because of this action, the remaining molten flux creeps no farther than the edge of the painted strip of the fluoride. The fused filler metal can likewise spread no farther than this barrier since the wetting action of the flux ceases at this point. Upon completion of the fusion, the assembly is removed from the furnace and cooled, and the flux residue and the remaining sodium fluoride are readily washed away.

While I have described my invention more particularly with respect to those materials which may be employed to limit the spread, in the molten state, of salt type fluxes, the spread of other types of fluxes which are fluid at the temperature of the joining operation may be limited as well by employing as a stop-off agent a material which will interact with the fluid flux, where the effect of such solidification is to prevent any wetting of the metal surface by the fluid flux beyond the areas where the solidification occurs.

I claim:

1. In the art of fusion joining metals wherein an alkali metal chloride-containing flux and a filler metal are employed, the method of limiting the spread of fluid flux and filler metal at the temperature of the joining operation which comprises providing upon the surfaces of the members being joined, adjacent to the areas where the flux is applied, and prior to the fusion of the flux, a sodium fluoride stop-off stratum, the sodium fluoride of which is infusible at the temperature of the joining operation and interacts with the fluid flux to effectively prevent the spread of the fluid flux beyond the stop-off stratum.

2. In the art of fusion joining metals wherein an alkali metal chloride-containing flux and a filler metal are employed, the method of limiting the spread of fluid flux and filler metal at the temperature of the joining operation which comprises providing upon the surfaces of the members being joined, adjacent to the areas where the flux is applied, and prior to the fusion of the flux, a saline stop-off agent selected from the group of salts consisting of the fluorides of the metals sodium, potassium, lithium, barium, strontium, calcium, and magnesium, and of the double fluorides of one of said metals with aluminum and of one of said metals with silicon, said saline stop-off agent being infusible at the temperature of the joining operation and capable of interaction with the fluid flux to effectively prevent the spread of fluid flux beyond the stop-off agent.

3. In the art of fusion joining metals wherein an alkali metal chloride-containing flux and a filler metal are employed, the method of limiting the spread of fluid flux and filler metal at the temperature of the joining operation which comprises providing upon the surfaces of the members being joined, adjacent to the areas where the flux is applied, and prior to the fusion of the flux, a stop-off stratum consisting of about 80-98 per cent of at least one salt selected from the group consisting of the fluorides of the metals sodium, potassium, lithium, barium, strontium, calcium, and magnesium, and of the double fluorides of one of said metals with aluminum and one of said metals with silicon, together with about 2-20 per cent sodium silicate, said stop-off stratum being infusible at the temperature of the joining operation and capable of interaction with the fluid flux to effectively prevent the spread of the fluid flux beyond said stop-off stratum.

MIKE A. MILLER.